3,089,830
METHOD OF MAKING A COMPARTMENTED FUEL ELEMENT FOR A NUCLEAR REACTOR
Robert K. McGeary and Erling Frisch, Pittsburgh, Pa., assignors, by mesne assignments, to the United States of America as represented by the United States Atomic Energy Commission
Filed Mar. 24, 1958, Ser. No. 723,421
3 Claims. (Cl. 204—154.2)

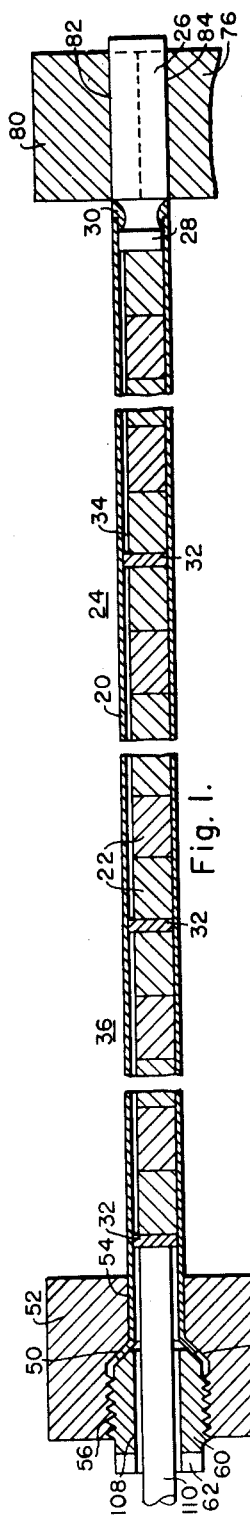
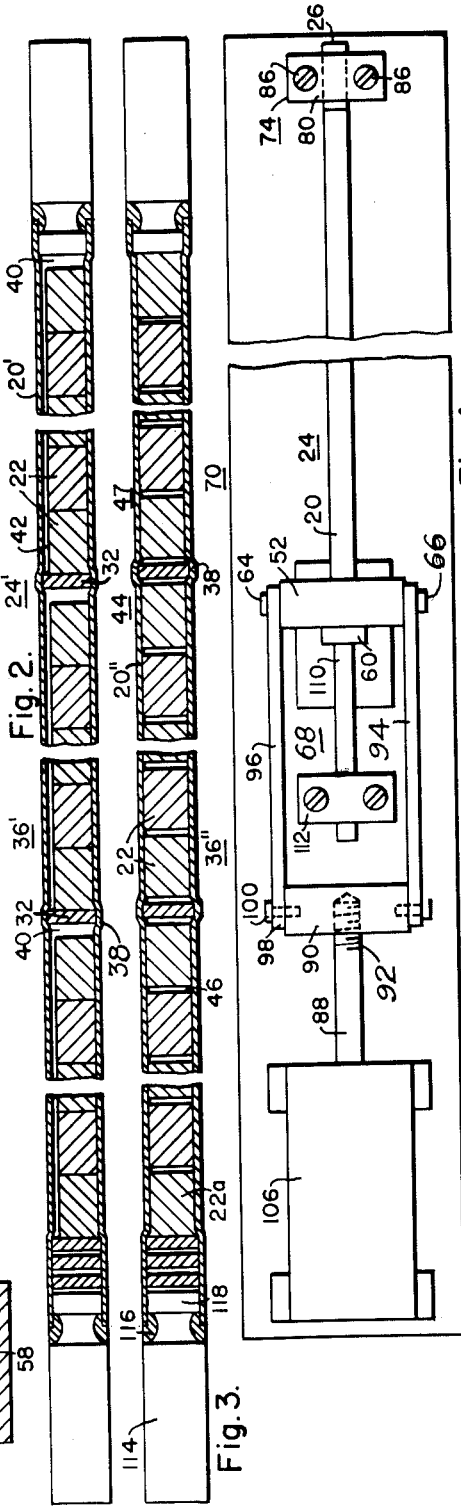
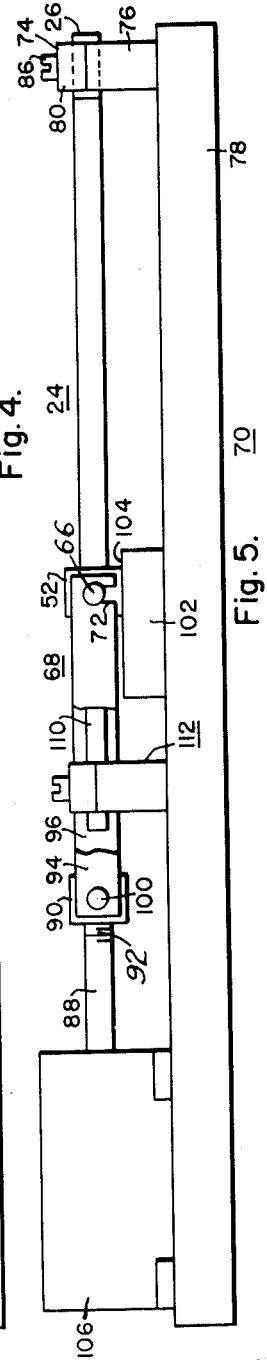
INVENTORS
Robert K. McGeary &
Erling Frisch.
BY
ATTORNEY United States Patent Office 3,089,830
Patented May 14, 1963

The present invention relates to the fuel element assembly for a heterogeneous neutronic reactor and more particularly to a fuel assembly adapted for use in a pressurized water reactor.

The fuel element disclosed herein is an improvement upon the fuel element described and claimed in a copending application of R. K. McGeary et al. entitled Fuel Element for a Neutronic Reactor, Ser. No. 721,776, filed March 17, 1958 and assigned to the present assignee. Accordingly the fuel element of the present invention is adapted for assembly and application as described in connection with the fuel element assemblies and the reactor systems incorporated by reference in the aforesaid copending application.

The fuel element of the character described comprises an elongated cladding tube into which a plurality of fuel pellets are inserted and which extend along substantially the entire length of the cladding tube. In a specific embodiment of the invention, the cladding tube is circular in cross-section and the fuel pellets are fabricated in the form of relatively short, right cylinders. In known types of fuel elements, clearances are provided between the inner wall of the cladding tube and the cylindrical surfaces of the fuel pellets in order to permit relative movement thereof due to differential expansion during the operation of the neutronic reactor. However, the accumulation of chips and particles of the reactor fuel and other debris in these clearances may prevent gross movement of the fuel pellet column relative to the cladding tube such that the latter buckles or otherwise becomes distorted.

The aforesaid differential expansion results from the fact that the central portions of the fuel pellets are considerably hotter during operation of the reactor, and thus the fuel pellets expand more than the cladding tube although the latter usually has the higher coefficient of expansion. This temperature difference between the central portions of the fuel pellets and the cladding tube is amplified by the aforesaid diametric clearances of the fuel element. To permit differential expansion of the fuel pellets in the longitudinal direction, a void has been established usually at one end of prior fuel elements. In a pressurized water reactor, however, the pressures encountered during operation dictate the use of a relatively thicker cladding tube to prevent collapse at the void thereof. The use of additional cladding material, which must be corrosion-resistant in the case of pressurized water reactor, not only involves greater expense but moreover is detrimental to neutronic economy of the reactor system.

This problem is obviated in accordance with the present invention by providing the fuel element with a series of compartments extending longitudinally thereof in a manner presently to be described. By use of these compartments the aforementioned void is divided in one form of the invention into a plurality of shorter spaces formed respectively in the compartments and collapse of the fuel element in the aforementioned void is prevented. The use of such shorter spaces or voids increases the pressure which the cladding tube can withstand, which, of course, is dependent upon the longitudinal length of each void or space of the cladding tube which is unsupported by fuel pellets. Moreover, the division of the fuel pellet column in this manner prevents the aforesaid gross movement of the fuel column, thereby obviating the buckling or other distortion of the cladding tube. It has been found that the fuel columns in the neighborhood of approximately ten inches in length, assuming the dimensions enumerated hereinafter, that the buckling effects caused by differential expansion between the relatively shorter fuel columns and the adjacent portions of the cladding tube are negligible.

In a preferred arrangement of the invention, the compartmented fuel element of the invention has the additional advantage that the individual compartments thereof are hermetically sealed one from another. Thus a rupture in the cladding tube wall will, in all probability, expose the contents of only one compartment of the fuel element to the surrounding reactor coolant. It follows, then, that only a small fraction of the dangerously radioactive fission products contained within the fuel element is released to the primary reactor coolant system.

The method of fabricating the compartmented fuel element in accordance with one aspect of the invention also serves to eliminate the clearances initially provided between the fuel pellets and the adjacent cladding tube wall. As a result, heat transfer between the reactor fuel and coolant is greatly facilitated. This stems from the facts that a thinner cladding tube can be employed and that the cladding tube is in intimate contact with the cylindrical surfaces of the fuel pellets.

Accordingly an object of the invention is to provide a novel and efficient fuel element adapted for use in a neutronic reactor.

Another object of the invention is the provision of a novel form of a compartmented fuel element.

A further object of the invention is the provision of a novel method for fabricating a compartmented nuclear fuel element.

Still another object of the invention is the provision of a fuel element having novel means for spacing the fuel pellets thereof.

Still another object of the invention is the provision of a fuel element having novel means associated therewith for minimizing the escape of radioactivity therefrom in the event of rupture and for improving the heat transfer characteristics thereof.

These and other objects, features and advantages of the invention will be elaborated upon in the forthcoming description of an illustrative form of the invention, with the description being taken in conjunction with the accompanying drawings wherein, FIGURE 1 is a longitudinally sectioned view of an initial assembly of the fuel element to be arranged in accordance with the invention and showing in addition certain steps of the method employed in fabricating the fuel element, FIGURE 2 is a longitudinally sectioned view of one form of a reactor fuel element arranged in accordance with the invention, FIGURE 3 is a longitudinally sectioned view of another form of the fuel element of the invention, FIGURE 4 is a top plan view of the fuel element and apparatus employed in carrying out the method of the invention, and FIGURE 5 is a side elevation of the fuel element and apparatus illustrated in FIGURE 4.

Referring now in particular to FIGURE 1 of the drawings, a preassembled form 24 of the fuel element of the invention shown therein comprises an elongated cladding tube 20 into which a plurality of fuel pellets 22 are loosely inserted. In the event that the fuel element is employed in a pressurized water reactor, the coolant of which is rather corrosive at the elevated temperatures and pressures encountered in the reactor, the cladding tube 20 is fabricated from stainless steel, zirconium, an alloy of the latter, or other corrosion-resistant material. The cladding tube 20 is somewhat longer than the column of fuel pellets 22 in order to accommodate an end plug 26 provided with necked down or shouldered portion 28 which is inserted into one end of the cladding tube 20. The end plug 26 is hermetically sealed to the cladding tube by means of an annular sealing and structural weld 30. The other end of the cladding tube 20 is closed after fabrication of the fuel element 24 in a manner described hereinafter in connection with the cladding tube 20" of FIGURE 3.

In an exemplary arrangement of the invention, the fuel pellets 22 are fabricated from an oxide of one of the fuel materials, such as $U^{235}$, $U^{233}$, $Pu^{239}$, $U^{238}$ and $Th^{232}$. In the event that the latter two fuel materials $U^{238}$ or $Th^{232}$ are employed, which are better known as fertile or blanket materials, a proportion of one or more of the remaining isotopes are admixed in order to sustain a chain reaction in the well-known manner. More specifically, the pellets 22 can be formed from uranium oxide ($UO_2$) which is enriched to 2.6% of $U^{235}$ when employing the fuel element, for example, in the neutronic reactor described in the aforementioned copending application.

At intervals along the length of the fuel pellet column a plurality of metallic spacing disks 32 are disposed. The metallic disks 32 desirably are of the same material as that constituting the cladding tube 20 and in this example both the cladding tube and the disks are fabricated from stainless steel.

In one arrangement of the invention, the cladding tube 20 is furnished with an inside diameter of 0.3045±.001 inch while the diameter of the cylindrical fuel pellets is 0.3000±.0005 inch, with the result that an initial total diametric clearance 34 of between three and six mils is provided between the fuel pellets and the inner wall of the cladding tube 20. On the other hand, the spacing disks 32 are fabricated with a diameter of .3015±.0002 inch so that the total clearance between the disks and the cladding tube varies between approximately two and four mils. It will be seen, then, that the diameter of the spacing disk 32 is slightly larger than that of the fuel pellets 22. This difference in diameter is advantageous, during subsequently described fabricational operations, for purposes of maintaining the spacing disks 32 in upright positions thereof as shown in FIGURE 1 and to secure a reliable hermetic seal between the disks 32 and the cladding tube 20.

Before placing the disks 32 and the pellets 22 into the cladding tube 20, the disks 32 are coated, at least at their diametric edges, with a thin layer of a brazing alloy such as Nicrobraz alloy made by Wall-Colmonoy Co., Detroit, Michigan, and containing chromium and phosphorous in nickel base. Following this operation, the tubing diameter is reduced by stretching the cladding tube 20 until a press fit is obtained between the tube wall and each of the disks thereby fixing the position of the latter. This stretching operation is continued, as described below in greater detail, until an adequate space or void 40 is provided between the pellets 22 and the spaced disks 32 of each compartment 36 to allow for the aforementioned differential longitudinal expansion of the pellet column relative to the cladding tube 20 during operation of the reactor.

As illustrated in FIGURE 2 of the drawings, this operation produces a slight bulge 38 of the cladding tube 20' adjacent each of the spacing disks 32. It will also be seen, in this form of the invention, that a void 40 is formed in each compartment 36' of the fuel element. However, the longitudinal length of the void 40 is relatively short and consequently collapse of the cladding tube 20' in the region of the void 40 is prevented, although a thinner cladding tube 20' can be employed than would be possible in the case where the expansional void is accumulated at one area as in known fuel elements.

When the fuel element 24' has been elongated only to an extent sufficient to form a press fit between the disks 32 and the cladding tube, some clearance 42 still remains between the fuel pellets and the cladding tube 20'. Following the aforementioned stretching operation, the open end of the cladding tube is closed and sealed and the fuel rod is heated to the brazing temperature of the aforementioned brazing alloy, or 1850–1900° F., in a hydrogen atmosphere in order to bond and hermetically seal the spacing disks 32 to the adjacent inner wall of the cladding tube 20'. In the form of invention illustrated in FIG. 2, some clearance remains between the fuel pellets and the cladding tube 20', as aforesaid. However, gross movement of the total fuel pellet column is prevented by the rigidly secured spacing disks 32 and any movement is limited to the short fuel column of each compartment 36'.

Although it is not necessary to seal hermetically the spacing disks 32 to the cladding 20' in order to practice the invention, such sealing is preferable in order to minimize contamination of the reactor coolant system in the event of rupture in the cladding tube 20'. As pointed out previously, the escape of hazardous material into the reactor coolant would in such event be limited virtually to the contents of one compartment 36' (FIG. 2) or 47 (FIG. 3) of the fuel element. Before stretching the cladding tube 20', the interior thereof can be filled with a heat exchanging gas such as helium in order to make a transfer of heat from the pellets across the clearance 42 to the cladding tube 20'.

In another embodiment of the invention as better shown in FIGURE 3 of the drawings, the cladding tube 20" thereof desirably is stretched still farther before the brazing operation to cause the cladding tube to grip positively the outer periphery of each of the fuel pellets 22. This last-mentioned stretching operation, which is carried out with the apparatus described hereinafter, operates to cause the cladding tube to come into intimate contact with the individual pellets 22 so that no clearance exists between the pellets and cladding tube. With this arrangement the aforementioned heat transfer gas can be eliminated and the heat transfer characteristics of the fuel rod 44 of FIGURE 3 is improved still further by elimination of these clearances. Moreover, by stretching the cladding tube 20" still farther after the tube has gripped the fuel pellets 22, the latter are separated slightly to provide spaces 46 therebetween and between the pellet column and spacing disks 32 of each compartment 47. These spaces 46 are desirable to permit differential longitudinal expansion of the interior portions of the pellets 22 relative to the cladding tube and to afford space for the collection of chips, particles, and other debris during operation of the fuel element.

Referring now to FIGURES 1, 4 and 5 of the drawings, an examplary method and apparatus are illustrated therein for stretching or elongating the cladding tube 20 in accordance with the invention. As stated previously, the fuel element 24, FIGURE 1, is provided with an end plug 26 at one end thereof. The other end of the cladding tube 20 is flanged or flared outwardly as denoted by the reference numeral 50, and the cladding tube is inserted through a chuck member 52 having an aperture 54 extending therethrough for this purpose. The outward portion of the aperture 54 is tapped as denoted by a reference character 56 and the intermediate connecting portion thereof is formed with a frustoconical configuration 58, against which the flared portion 50 of the cladding tube 20 is seated. The flared end portion 50 of the cladding tube is secured in its position by means of an annular nut 60 threaded into a tapped aperture portion 56. The annular nut 60 is provided with a slot or other suitably keyed configuration 62 adapted for engagement with a conventionally shaped tool (not shown) for turning the nut 60.

As better shown in FIGS. 4 and 5 of the drawings, the chuck member 52 is provided with a pair of pins or stub shafts 64 and 66 whereby the chuck member 52 is joined to a movable bracket 68 of stretching or elongating apparatus denoted generally by the reference numeral 70. In furtherance of this purpose, the pins 64 and 66 are loosely inserted into a pair of vertically extending slots 72 formed in the bracket 68 adjacent the forward end thereof. The other end of the fuel element 24 is rigidly secured to the stretching apparatus 70 by securing the end plug 26 thereof in a suitable clamp denoted generally by the reference character 74. The clamp 74 comprises a base member 76 mounted upon a bed plate 78 of the stretching apparatus 70 and a clamping member 80. The clamping member 80 and the base member 76 are provided with complementary semi-circular grooves 82 and 84, respectively, whereby these components tightly grip the end plug 26 when the clamping member 80 is tightened down upon the base member 76 by means of a pair of cap screws 86.

The fuel element 24 is supported by its ends within the stretching apparatus 70 by means of the rigidly mounted clamp 74 and the chuck member 52, which is joined as described previously to the movable bracket 68. The bracket 68 is joined at its outward end to a linearly movable driving shaft 88. In furtherance of this purpose, the bracket 68 includes a cross member 90 which is joined to the end of the driving shaft 88 as by threading, denoted by the reference character 92, and a pair of elongated side members 94 and 96. The outward ends 98 of the side members 94 are pivoted loosely to the cross member 90 by means of a pair of shouldered screws 100 respectively. In this arrangement, the linearly movable driving shaft 88 and the bracket 68 are adapted to impart longitudinal motion to the chuck member 52 with vertical support being supplied for the latter by means of a base plate 102. The length of the base plate 102 in the direction of stretching movement is such that the chuck member 52 will slidably engage the surface 104 of the base plate at all times during the anticipated range of movement of the chuck member 52. A suitable driving means denoted generally by the reference numeral 106 is mounted adjacent the end of the bed plate 78 and is arranged to impart linear movement to the drive shaft 88. The driving means, for example, includes an electric motor and a conventional gearing train adapted to convert the rotary motion thereof to linear movement of the drive shaft 88, or alternatively, a hydraulic cylinder and piston, or a known form of screw-operated jack.

The annular nut 60 of the chuck member 52 is provided with a central longitudinally extending channel 108 through which a ram rod or plunger 110 is insertable. As shown in FIGURES 4 and 5 of the drawings, a clamp denoted generally by the reference character 112 is affixed to the bed plate 78 and is engageable with the ram rod 110 to prevent longitudinal movement thereof during certain steps of the stretching operation as presently described. The clamp 112 is similar to the clamp 74 described heretofore for securing the outward end of the fuel element 24 against longitudinal movement. The clamp 112 is disposed intermediately of the side members 94 and 96 of the movable bracket 68 so as not to interfere with longitudinal movement of the bracket 68.

After the fuel element 24 has been initially assembled as explained in connection with FIGURE 1 of the drawings, the fuel element is mounted in the stretching apparatus 70 as shown in FIGURES 4 and 5 of the drawings. In one method for stretching the preassembled fuel element 24, the plunger 110 is inserted into the open end of the cladding tube 20 via the annular nut 60 and is placed in bearing relationship relative to the adjacent end of the column of fuel pellets 22 and spacing disks 32. Before the first stretching operation, the plunger 110 is secured in this position by tightening the clamp 112.

The driving means 106 is then actuated to impart linear movement to the driving shaft 88 whereby the bracket 68 and chuck member 52 are moved to the left in the arrangement shown in FIGS. 4 and 5. With the dimensions of cladding tube 20, fuel pellets 22 and spacing disks 32 as described herein, stretching movement of the driving shaft 88 is continued until the cladding tube 20 has received a permanent elongation of approximately one percent. When the cladding tube 20 has been elongated to this extent, its inside diameter has been reduced to a minimum of 0.302 inch. This dimension is slightly larger than the diameter of the spacing disks 32 in order to permit movement of the cladding tube 20 relative to the spacing disks. As stated heretofore, the diameter of the spacing disks 32 is slightly larger than that of the pellets 22. Accordingly the first stretching step is discontinued just before the cladding tube is reduced in diameter to a point where it would engage the spacing disks 32.

Following this initial stretching operation, the clamp 112 is disassembled and the plunger 110 is removed from the open end of the cladding tube 20. With the plunger now removed, the cladding tube is again elongated by the stretching apparatus 70. The second stretching operation is continued in this fashion until a permanent elongation of an additional two percent is imparted to the cladding tube 20. Assuming the dimensions noted heretofore, the inside diameter of the stretched cladding tube 20 will be reduced to a maximum of 0.301 inch, which is equivalent to a reduction of the inside diameter of the tube to 99.9006±0.0002 percent of the diameter of the spacing disks. This ensures an interference or press fit between the cladding tube 20 and each of the spacing disks 32 with the result that the location of the individual disks 32 within the cladding tube 20 is fixed. Because the pellets 22 are slightly smaller in diameter than the spacing disks 32, the diametric clearance between the cladding tube 20 and the fuel pellets 22 will range between .000 inch and .0015 inch for the dimensions noted heretofore. Alternatively, by making the spacing disks slightly larger than that specified previously, the fuel pellets 22 within each compartment 36 of the fuel element 24' will be free to move longitudinally within the compartment 36' as shown in FIGURE 2 of the drawings. In the latter arrangement of the invention stretching is continued until void 40 of each compartment 36' is about 0.160 inch long, or occupying about two percent of the longitudinal length of a compartment approximately eight inches in length. This is more than sufficient for pellet expansion, under maximum operating conditions of the reactor, yet it is small enough to eliminate collapsing of the tube in this area at the maximum operating pressures of the reactor.

On the other hand with the dimensions described previously, the pellets 22 can be gripped individually by the inner wall surface of the cladding tube 20" (FIG. 3). This can be accomplished by imparting a slight amount of additional elongation to the cladding tube 20". As a result the pellets 22 within each fuel element compartment 36" will be gripped by the cladding tube 20" and will be spaced from one another as shown in FIGURE 3 of the drawings.

After the aforesaid stretching operations have been completed, the fuel element 44 or 24' is removed from the stretching apparatus 70 and is cut to the desired length, thereby eliminating the flared end portion 50 thereof. The open end of the cladding tube is closed by means of an end plug 114 similar to the end plug 26 described heretofore. The end plug 114 is joined to the heretofore open end of the cladding tube 20 by means of an annular sealing weld 116. If a void space remains between the inner end 118 and the endmost fuel pellet 22a, the space is taken up by one or more spacing disks 120 which are inserted therein.

As stated previously, each of the spacing disks 32 have been coated with a brazing alloy. After the stretching operations and closure of the open end of the cladding tube 20, the fuel element of FIGS. 2 and 3 is placed in a furnace and heated to a brazing temperature of 1850–1900° F. which is sufficient to melt the aforesaid brazing alloy and to hermetically seal the spacing disks 32 to the inner wall surface to the cladding tube 20' or 20" respectively. In this manner, each fuel element compartment 36' or 36", respectively, is hermetically sealed from the remaining compartments, respectively. In the event of rupture of the cladding tube 20' or 20" at any one of these compartments, radioactive material will not be released from any other compartment.

In view of the foregoing, it will be apparent that a novel and efficient fuel element and methods for the fabrication thereof have been presented herein. It will be appreciated that the descriptive and illustrative matter employed herein is utilized for exemplifying the invention and is not to be interpreted as limitative thereof. The cladding tube 20 and the fuel pellets 22, for example, need not be circular in cross-section and any other suitable configuration such as a plate-type fuel element can be employed.

Accordingly, numerous modifications will occur to those skilled in the art without departing from the spirit and scope of the invention. Moreover, it is to be understood that certain features of the invention can be utilized without corresponding use of other features thereof.

Therefore, what is claimed as new is:

1. A method for making a fuel element of a neutronic reactor, said method including the steps of inserting a column of fuel pellets and spacing disks having diametric edges continuously coated with brazing material into a continuous cladding tube, said spacing disks being spaced along the length of said column, stretching without compressing said cladding tube in the longitudinal direction sufficiently to elongate the tube about one percent while restraining movement of said fuel pellet column until the walls of said cladding tube very nearly engage said spacing disks; then stretching said cladding tube longitudinally without restraining said pellet column, sufficiently to elongate the tube an additional two percent; then closing the ends of the cladding tube; then heating the assembly to a temperature within the range of 1850°–1900° F. for a sufficient time to soften the brazing material and hermetically attach the diametric edges of the spacing disks to the internal walls of the tube.

2. A method for fabricating a fuel element of a neutronic reactor, said method comprising the steps of inserting a column of fuel pellets and unitary spacing disks having their diametric edges continuously covered with brazing material into a continuous elongated cladding tube, said spacing disks being spaced along the length of said column and being slightly larger than said pellets in a direction transversely of said cladding tube, stretching without compressing said cladding tube while restraining movement of said column until said cladding tube very nearly engages said spacing disks, stretching said cladding tube without restraining said column until the inner wall of said cladding tube engages said spacing disks so as to form compartments containing fuel pellets while leaving the fuel pellets free to move therein; closing the ends of said cladding tube; and then heating the assembly within the range of 1850°–1900° F. for a sufficient time to soften the brazing material and to make the compartments hermetic.

3. A method of making a fuel element for a neutronic reactor, said method comprising steps of inserting a column of fuel pellets and spacing disks within an elongated cladding tube, said spacing disks being spaced along the length of said column and being slightly larger than said fuel pellets in a direction transversely of said cladding tube, stretching without compressing said cladding tube longitudinally thereof while restraining said pellet column until the inner wall of said cladding tube very nearly engages said spacing disks, stretching without compressing said cladding tube without restraining said column until said inner wall tightly engages said spacing disks, continuing stretching without compressing of said cladding tube until its inner wall surface tightly engages each of said fuel pellets and separates said fuel pellets to form spaces therebetween, and closing the ends of said cladding tube.

References Cited in the file of this patent

UNITED STATES PATENTS

| 1,261,590 | Moore | Apr. 2, 1918 |
| 1,565,065 | Doerr | Dec. 8, 1925 |
| 2,110,752 | Wright | Mar. 8, 1938 |
| 2,441,858 | Wattee | May 18, 1948 |
| 2,798,848 | Kingdon | July 9, 1957 |
| 2,825,689 | Szilard et al. | Mar. 4, 1958 |
| 2,838,452 | West et al. | June 10, 1958 |
| 2,852,456 | Wade | Sept. 16, 1958 |
| 2,852,460 | Abbott et al. | Sept. 16, 1958 |
| 2,853,446 | Abbott et al. | Sept. 23, 1958 |
| 2,856,341 | Kanne | Oct. 14, 1958 |
| 2,874,459 | Haldeman | Feb. 24, 1959 |
| 2,879,216 | Hurwitz et al. | Mar. 24, 1959 |
| 2,886,503 | Szilard et al. | May 12, 1959 |
| 2,890,158 | Ohlinger et al. | June 9, 1959 |
| 2,947,080 | Kates et al. | Aug. 2, 1960 |
| 3,053,743 | Cain | Sept. 11, 1962 |

OTHER REFERENCES

TID–7546 (Book 1), Fuel Elements Conference, Nov. 23, 1957, page 192.